United States Patent
Choi et al.

(10) Patent No.: US 8,963,848 B2
(45) Date of Patent: Feb. 24, 2015

(54) TOUCH SCREEN PANEL

(75) Inventors: Jung-Ho Choi, Yongin (KR); Chi-Wook An, Yongin (KR); Jeong-Yeol Lee, Yongin (KR); Keun-Soo Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 328 days.

(21) Appl. No.: 13/009,201

(22) Filed: Jan. 19, 2011

(65) Prior Publication Data

US 2012/0075257 A1 Mar. 29, 2012

(30) Foreign Application Priority Data

Sep. 29, 2010 (KR) .................. 10-2010-0094227

(51) Int. Cl.
G06F 3/044 (2006.01)

(52) U.S. Cl.
CPC ...... *G06F 3/044* (2013.01); *G06F 2203/04111* (2013.01)
USPC ......................................... 345/173; 345/174

(58) Field of Classification Search
CPC .............. G06F 2203/04111; G06F 3/044
USPC .................................. 345/173–174
See application file for complete search history.

(56) References Cited

U.S. PATENT DOCUMENTS

| 2010/0295819 | A1* | 11/2010 | Ozeki et al. | 345/174 |
| 2011/0057887 | A1* | 3/2011 | Lin et al. | 345/173 |
| 2011/0141038 | A1* | 6/2011 | Kuo et al. | 345/173 |

FOREIGN PATENT DOCUMENTS

| JP | 2008-310550 | 12/2008 |
| KR | 10-0659048 | 12/2006 |
| KR | 10-2008-0092634 | 10/2008 |
| KR | 10-2009-0131638 | 12/2009 |

* cited by examiner

*Primary Examiner* — Quan-Zhen Wang
*Assistant Examiner* — Tony Davis
(74) *Attorney, Agent, or Firm* — Robert E. Bushnell, Esq.

(57) ABSTRACT

A touch screen panel includes a transparent substrate. A plurality of first and second sensing cells are formed so as to be connected along first and second directions, respectively. The second sensing cells are disposed between the first sensing cells. A plurality of first and second connection patterns connect the first and second sensing cells to one another along the first and second directions, respectively. A first insulating layer is interposed between the first second connection patterns. In the touch screen panel, each of the first connection patterns includes a main bridge pattern separately patterned in a different layer from the first sensing cells connected by the main bridge pattern to connect adjacent first sensing cells to other along the first direction, and one or more sub-bridge patterns which branch from the main bridge pattern, and which have both ends connected to the main bridge pattern so as to form a detour path.

20 Claims, 3 Drawing Sheets

TOUCH SCREEN PANEL

CLAIM OF PRIORITY

This application makes reference to, incorporates the same herein, and claims all benefits accruing under 35 U.S.C. §119 from an application earlier filed in the Korean Intellectual Property Office on the 29 Sep. 2010 and there duly assigned Serial No. 10-2010-0094227.

BACKGROUND OF THE INVENTION

1. Field of the Invention

The present invention relates to a touch screen panel and, more particularly, to a touch screen panel capable of preventing the occurrence of a driving failure caused by static electricity.

2. Description of the Related Art

A touch screen panel is an input device which allows a user's instruction to be inputted by selecting an instruction content displayed on a screen of a display device or the like with a user's hand or object.

To this end, the touch screen panel is formed on a front face of the display device so as to convert a contact position into an electrical signal. In this regard, the user's hand or object is directly in contact with the touch screen panel at the contact position. Accordingly, the instruction content selected at the contact position is inputted as an input signal to the display device.

Since such a touch screen panel can be substituted for a separate input device connected to a display device, such as a keyboard or mouse, its fields of application have been gradually extended.

Touch screen panels are divided into a resistive overlay touch screen panel, a photosensitive touch screen panel, a capacitive touch screen panel, and the like.

Among these touch screen panels, the capacitive touch screen panel converts a contact position into an electrical signal by sensing a change in the capacitance formed between a conductive sensing cell and an adjacent sensing cell, ground electrode or the like when a user's hand or object is in contact with the touch screen panel.

In this regard, in order to clearly detect a contact position at a contact surface, the sensing cells include first sensing cells formed so as to be connected along a first direction by first connection patterns and second sensing cells formed so as to be connected along a second direction by second connection patterns.

Generally, the first and second connection patterns intersect each other while being insulated from each other with an insulating layer interposed therebetween. Since the width of the connection patterns is narrower than that of patterns in the sensing cells themselves, the resistance of the connection patterns is relatively greater than that of the sensing cells. Therefore, the intersecting portions of the first and second patterns may be easily damaged by static electricity.

In the case where damage, such as insulation breakdown or disconnection due to the static electricity, occurs at the intersecting portions of the first and second connection patterns, a driving failure of the touch screen panel is caused.

SUMMARY OF THE INVENTION the present invention comprises a touch screen panel which is capable of preventing the occurrence of a driving failure caused by static electricity.

According to an aspect of the present invention, a touch screen panel comprises: a transparent substrate; a plurality of first sensing cells formed so as to be connected along a first direction on the transparent substrate; and a plurality of second sensing cells disposed between the first sensing cells and formed so as to be connected along a second direction on the transparent substrate; a plurality of first connection patterns which connect the first sensing cells to one another along the first direction; a plurality of second connection patterns which connect the second sensing cells to one another along the second direction; and a first insulating layer interposed between the first connection patterns and the second connection patterns; wherein each of the first connection patterns comprises a main bridge pattern separately patterned in a different layer from the first sensing cells connected by the main bridge pattern so as to connect adjacent first sensing cells to each other along the first direction, and one or more sub-bridge patterns which branch from the main bridge pattern and which have both ends connected to the main bridge pattern so as to form a detour path.

The sub-bridge pattern may be extended from a starting point which branches from one point of the main bridge pattern and which is then bent at a predetermined angle one or more times so that an ending point of the sub-bridge pattern is connected to another point of the main bridge pattern.

A triangular shape may be made by combining the sub-bridge pattern and the main bridge pattern between the starting and ending points of the sub-bridge pattern.

The width of the sub-bridge pattern may be formed so as to be narrower than that of the main bridge pattern.

The touch screen panel may further include outer lines which connect the first and second sensing cells connected along the first and second directions for each line to an external driving circuit. The first connection patterns may be formed of the same material in the same layer as the outer lines.

The first connection patterns and the outer lines may be formed of a metallic material.

The first sensing cells, the second sensing cells and the second connection patterns may be formed of a transparent electrode material.

The second sensing cells and the second connection patterns may be integrally patterned for each line along the second direction.

The first sensing cells may have patterns separated from each other between the second sensing cells.

Both end portions of each of the first connection patterns may be connected to adjacent first sensing cells through contact holes.

A plurality of contact holes may be formed when one first connection pattern is connected to one first sensing cell.

The first connection patterns may be formed of an opaque metallic material, and the second connection patterns may be formed of a transparent electrode material together with the first and second sensing cells.

The width of the first connection patterns may be formed so as to be narrower than that of the second connection patterns.

One first connection pattern may be formed when adjacent first sensing cells are connected to each other.

The transparent substrate may be implemented as an upper substrate of a display panel so that the touch screen panel and the display panel are integrated with each other.

The first insulating layer may be implemented as an inorganic insulating layer entirely formed in a touch active area in which the first and second sensing cells and the first and second connection patterns are formed.

The sub-bridge pattern may be disposed so as to overlap with the second connection pattern adjacent thereto, and so as to protrude from the main bridge pattern on the same plane.

A plurality sub-bridge patterns may be formed at each of the first connection patterns.

The main bridge pattern may be designed so as to be inclined at a predetermined angle with respect to a horizontal or vertical direction determined as the first direction.

As described above, according to embodiments of the present invention, one or more sub-bridge patterns which branch from a main bridge pattern to form a detour path are formed at each first connection pattern which connects first sensing cells to each other along a first direction, so that it is possible to prevent a driving failure of a touch screen panel due to static electricity.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
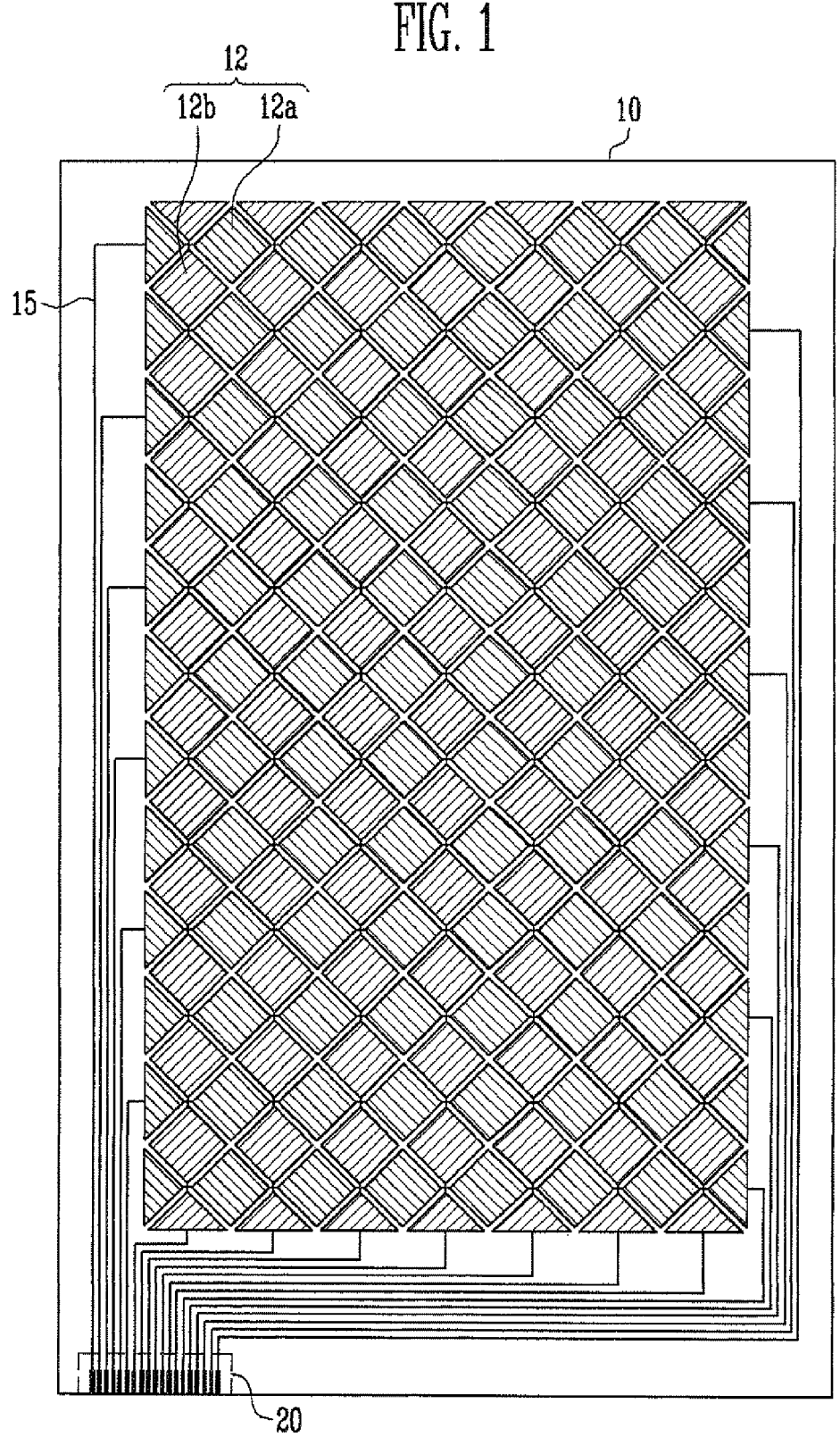
FIG. 1 is a plan view schematically showing a touch screen panel.

In the following detailed description, only certain exemplary embodiments of the present invention have been shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Exemplary embodiments of the present invention will now be described in detail with reference to the accompanying drawings.

FIG. 1 is a plan view schematically showing a touch screen panel.

Referring to FIG. 1, the touch screen panel includes a transparent substrate 10, sensing cells 12 formed in a touch active area on the transparent substrate 10, and outer lines formed in a non-touch active area at the outside of the touch active area so as to connect the sensing cells 12 to an external driving circuit (not shown) through a pad portion 20.

The sensing cells 12 include a plurality of first sensing cells 12a distributively arranged in the touch active area on the transparent substrate 10 and connected along a first direction, and a plurality of second sensing cells 12b distributively arranged between the first sensing cells 12a and connected along a second direction.

That is, the first and second sensing cells 12a and 12b, respectively, are alternately arranged so as to be connected along different directions from each other. For example, the first sensing cells 12a are formed so as to be connected along a row direction (horizontal direction), and row lines of the first sensing cells 12a are connected to the respective outer lines 15. The second sensing cells 12b are formed so as to be connected along a column direction (vertical direction), and column lines of the second sensing cells 12b are connected to the respective outer lines 15.

The first and second sensing cells 12a and 12b, respectively, are formed of a transparent electrode material such as indium tin oxide (ITO) so that light from a display panel (not shown) disposed below the first and second sensing cells 12a and 12b, respectively, can be transmitted to the first and second sensing cells 12a and 12b, respectively.

Meanwhile, although only simple lines are shown in FIG. 1 without designating reference numerals, a plurality of first connection patterns and a plurality of second connection patterns are further formed in the touch active area on the transparent substrate 10. In this regard, the plurality of first connection patterns are arranged along the first direction (e.g., the row direction) so as to connect the first sensing cells 12a to one another along the first direction. The plurality of second connection patterns are arranged along the second direction (e.g., the column direction) so as to connect the second sensing cells 12b to one another along the first direction. Embodiments of the connection patterns and detailed descriptions will be provided below.

The outer lines 15 are electrically connected to the row lines of the first sensing cells 12a and the column lines of the second sensing cells 12b, respectively, so that the first and second sensing cells 12a and 12b, respectively, are connected to an external driving circuit (not shown), such as a position detecting circuit, through the pad portion 20.

The outer lines 15 are arranged in the non-touch active area which is an outer portion of the touch screen panel, except for the touch active area in which images are displayed. The material of the outer lines 15 is selected in a wide range. Therefore, the outer lines 15 may be formed of not only a transparent electrode material used to form the sensing cells 12, but also a low-resistance metallic material such as molybdenum (Mo), silver (Ag), titanium (Ti), copper (Cu), aluminum (Al) or Mo/Al/Mo.

The touch screen panel, configured as described above, is a capacitive touch screen panel. If a contact object such as a user's finger or stylus pen comes into contact with the touch screen panel, a change in capacitance is caused by the contact position, and is transferred from the sensing cells 12 to the driving circuit (not shown) via the outer lines and the pad portion 20. Then, the change in capacitance is converted into an electrical signal by X and Y input processing circuits (not shown), thereby detecting the contact position.

Figure 2:
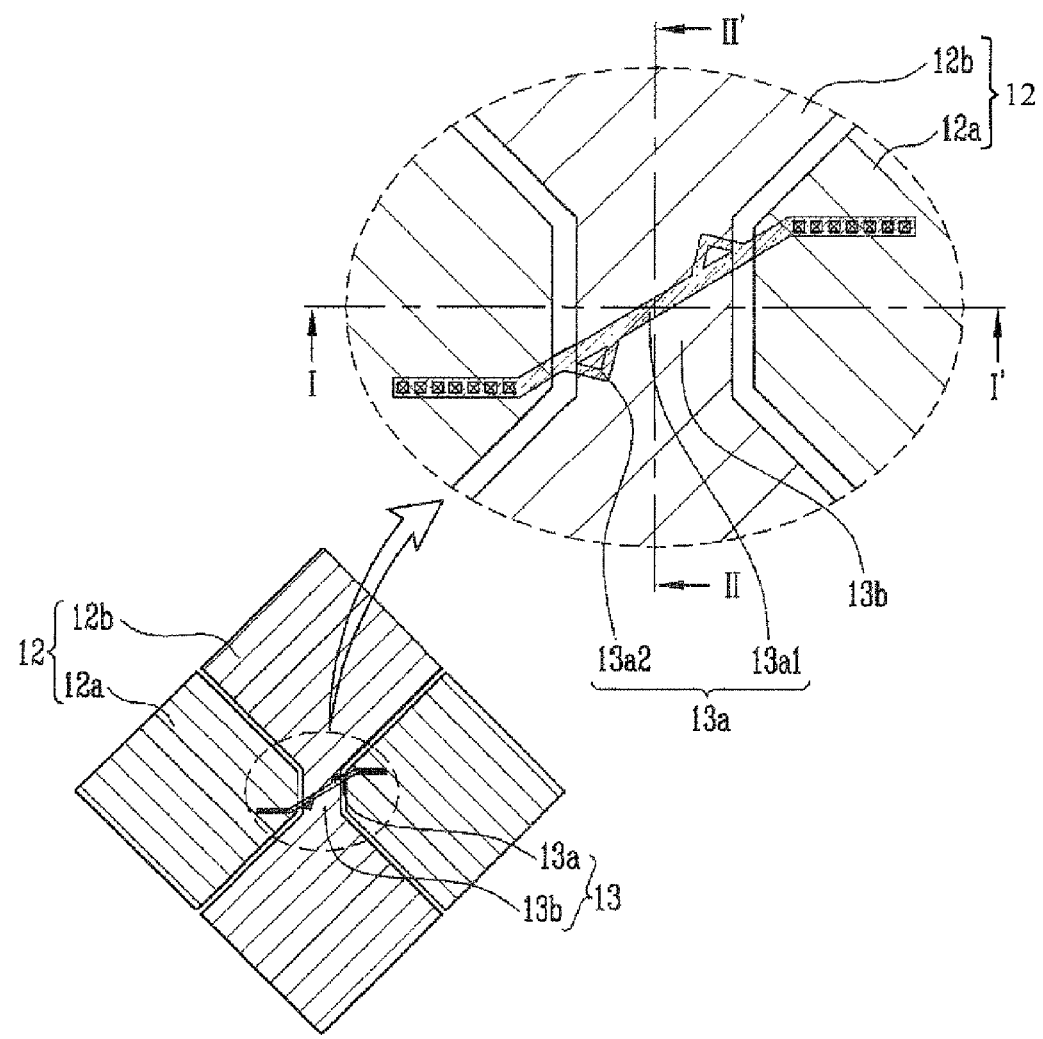
FIG. 2 is a plan view showing sensing cells and connection patterns in a touch screen panel according to an embodiment of the present invention.
Figure 3A:
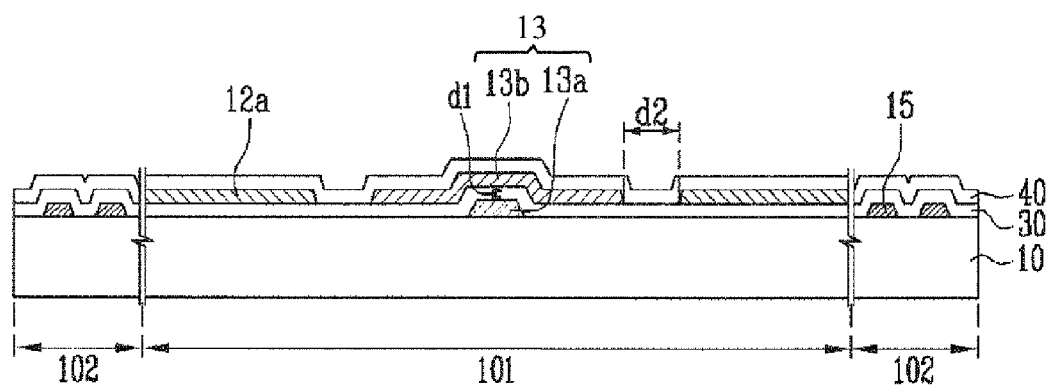
FIGS. 3A and 3B are main part sectional views of the touch screen panel taken along lines I-I' and II-II' respectively, of FIG. 2.
Figure 3B:
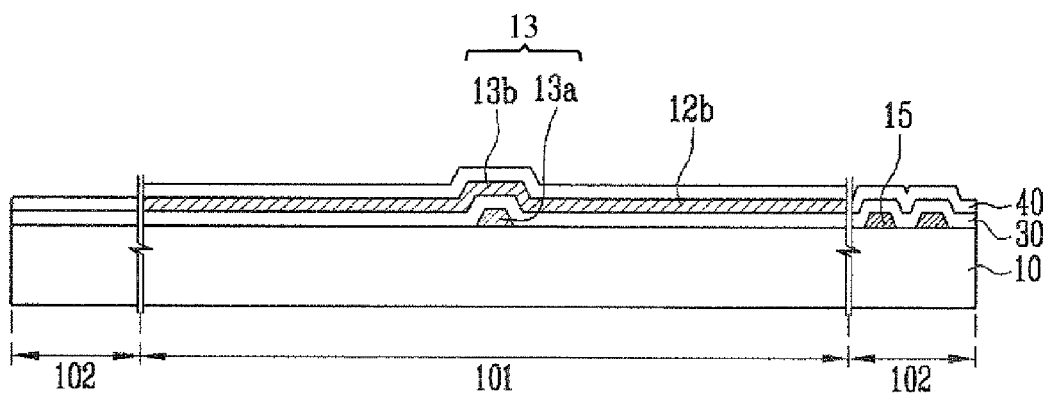

FIG. 2 is a plan view showing sensing cells and connection patterns in a touch screen panel according to an embodiment of the present invention, and FIGS. 3A and 3B are main part sectional views of the touch screen panel taken along lines I-I' and respectively, of FIG. 2.

For convenience of illustration, only adjacent two first sensing cells 12a, a first connection pattern 13a which connects the first sensing cells 12a to each other, adjacent two second sensing cells 12b, and a second connection pattern 13b which connects the second sensing cells 12a to each other are shown in FIG. 2. However, an actual touch screen panel has a structure in which the structure shown in FIG. 2 is repeatedly disposed in the touch active area. Therefore, a plurality of first connection patterns 13a and a plurality of second connection patterns 13b will be represented in the following description.

FIG. 2 and FIGS. 3A and 3B will be described in conjunction with FIG. 1. The touch screen panel according to this embodiment comprises: a transparent substrate 10; sensing cells 12, including a plurality of first sensing cells 12a and a plurality of second sensing cells 12b respectively formed so as to be connected along first and second directions, respectively, in a touch active area 101 on the transparent substrate 10; connection patterns 13, including a plurality of first connection patterns 13a which connect the first sensing cells 12a to one another along the first direction and a plurality of second connection patterns 13b which connect the second sensing cells 12b to one another along the second direction; and a first insulating layer 30 interposed between the first connection patterns 13a and the second connection patterns 13b so as to provide insulating properties. According to the design structure, the touch screen panel may further include a second insulating layer 40 entirely formed on the touch screen panel so as to protect the patterns formed on the transparent substrate 10.

In the latter regard, the touch active area 101, in which the first and second sensing cells 12a and 12b, respectively, and the first and second connection patterns 13a and 13b, respectively, are formed, is generally formed so as to overlap with an image display surface of a display panel (not shown) disposed below the touch active area 101. The touch active area 101 is implemented as a transparent element so that an image from a part of the display panel can be visualized.

To this end, the first and second sensing cells 12a and 12b, respectively, are formed of a transparent electrode material such as ITO. The first connection patterns 13a and/or the second connection patterns 13b are formed of a transparent electrode material like the first and second sensing cells 12a and 12b, respectively, or are formed of a low-resistance opaque metallic material. The width, thickness or length of the first connection patterns 13a and/or the second connection patterns 13b may be adjusted so as to prevent them from being visualized.

For example, the first connection patterns 13a may be formed of a low-resistance opaque metallic material, and the second connection patterns 13b may be formed of a transparent electrode material together with the first and second sensing cells 12a and 12b, respectively.

In this case, the first sensing cells 12a may be formed so as to have patterns separated from each other between the second sensing cells 12b. The first sensing cells 12a may be formed so as to be connected along the first direction by the first connection patterns 13a.

In this instance, the first connection patterns 13a may be separately patterned in a different layer from the first sensing cells 12a connected by the first connection patterns 13a. As shown in FIG. 2, both end portions of each of the first connection patterns 13a may be connected to adjacent first sensing cells 12a through contact holes.

When one first connection pattern 13a is connected to one first sensing cell 12a, one or more contact holes are formed. In this instance, two or more contact holes may be formed so as to decrease contact resistance. The number of contact holes may be adjusted in consideration of contact resistance, visibility and the like.

In this embodiment, the first sensing cells 12a and the first connection patterns 13a are not necessarily connected through the contact holes. In a case where the first insulating layer 30 is locally formed at intersection portions of the first and second connection patterns 13a and 13b, respectively, the first sensing cells 12a and first connection patterns 13a may be connected through direct contacts.

Meanwhile, in a case where the second connection patterns 13b are formed of a transparent electrode material, the second sensing cells 12b and the second connection patterns 13b are integrally patterned for each line along the second direction as a result of a patterning process of the transparent electrode material, thereby simplifying the process.

In a case where the first connection patterns 13a are formed of a low-resistance opaque metallic material, the first connection patterns 13a and the outer lines 15 are simultaneously formed in a process of forming the outer lines 15 arranged in the non-touch active area 102, thereby simplifying the process. That is, the first connection patterns 13a may be formed of the same material in the same layer as the outer lines 15.

In the case of the first connection patterns 13a being formed of the low-resistance opaque metallic material, the width of the first connection patterns 13a is limited so that it is possible to prevent the first connection patterns 13a from being visualized. Thus, the width of the first connection patterns 13a is formed so as to be narrower than that of the second connection patterns 13b formed of the transparent electrode material.

That is, the first connection patterns 13a are necessarily designed so as to be narrow in consideration of visibility. In this case, failures are easily generated in the first connection patterns 13a by static electricity concentrated on the intersection portions of the first and second connection patterns 13a and 13b, respectively, thereby resulting in a driving failure of the touch screen panel.

Accordingly, this embodiment is conceived to prevent the driving failure of the touch screen panel due to the static electricity. To this end, a sub-bridge pattern 13a2 is formed at each of the connection patterns 13a.

More specifically, in this embodiment, each of the first connection patterns 13a includes a main bridge pattern 13a1 which connects adjacent first sensing cells 12a to each other along the first direction, and one or more sub-bridge patterns 13a2 which branch from the main bridge pattern 13a1. In this case, both ends of the sub-bridge pattern 13a2 are connected to the main bridge pattern 13a1 so as to form a detour path. For example, the sub-bridge pattern 13a2 may be disposed so as to overlap with the second connection patterns 13b adjacent thereto. The sub-bridge pattern 13a2 may be formed so as to protrude from the main bridge pattern 13a1 on the same plane.

In this case, although a region of the main bridge pattern 13a1 is disconnected, the connection state of the first connection pattern 13a can be maintained through the sub-bridge pattern 13a2, thereby preventing a driving failure of the touch screen panel due to static electricity.

Meanwhile, the sub-bridge pattern 13a2 is extended from the starting point which branches from one point of the main bridge pattern 13a1 and is then bent at a predetermined angle one or more times so that the ending point of the sub-bridge pattern 13a2 can be connected to another point of the main bridge pattern 13a1. For example, the main bridge pattern 13a1 and the sub-bridge pattern 13a2 may be formed in a structure in which a triangular shape is obtained by combining the sub-bridge pattern 13a2 and one region between the starting and ending points. In this case, static electricity is induced into the sub-bridge pattern 13a2 so that it is possible to improve the weakness of the main bridge pattern 13a1 to the static electricity.

The width of the sub-bridge pattern 13a2 may be formed so as to be narrower than that of the main bridge pattern 13a1. In this case, the static electricity is more effectively induced into the sub-bridge pattern 13a2 so that it is possible to prevent disconnection of the main bridge pattern 13a1 in advance. That is, although the static electricity is induced, a disconnection failure due to the static electricity or the like does not occur in the sub-bridge pattern 13a2 rather than in the main bridge pattern 13a1. Thus, it is possible to ensure the stability of the main bridge pattern 13a1.

One or more sub-bridge patterns 13a2 are formed at each of the first connection patterns 13a. In the case of a plurality of sub-bridge patterns being formed at each of the first connection patterns 13a, it is possible to more effectively prevent the disconnection of the main bridge pattern 13a1 due to static electricity. However, the number of sub-bridge patterns 13a2 may be adjusted in consideration of visibility together with the improvement in the prevention of failure caused by static electricity.

Meanwhile, the main bridge pattern 13a1 may be designed in consideration of visibility. For example, the main bridge pattern 13a1 may be designed so as to be inclined at a predetermined angle with respect to the horizontal direction (row direction) or vertical direction (column direction) determined as a first direction. In this case, according to the visual characteristics of human beings, in which the recognition degree for a diagonal direction is lower than that of the horizontal or vertical direction, the main bridge pattern 13a1 is less visualized, so that it is possible to enhance the visibility of an image from the display panel.

As described above, according to this embodiment, one or more sub-bridge patterns 13a2, which branch from the main bridge pattern 13a1 so as to form a detour path, are formed at each of the first connection patterns 13a, which connects the first sensing cells 12a to each other along the first direction, so that it is possible to prevent driving failure of the touch screen panel due to static electricity.

In the case where the sub-bridge pattern 13a2 is bent at a predetermined angle one or more times, or where the width of the sub-bridge pattern 13a2 is formed so as to be narrower than that of the main bridge pattern 13a1, static electricity is more easily induced into the sub-bridge pattern 13a2, so that it is possible to effectively improve the weakness relative to static electricity at the intersection portion of the first and second connection patterns 13a and 13b, respectively.

That is, this embodiment provides a touch screen panel having a structure which is strong relative to static electricity by forming the sub-bridge pattern 13a2 at each of the metal bridge patterns (i.e., the first connection patterns 13a) formed of an opaque metallic material.

Accordingly, since it is sufficient to form only one first connection pattern 13a in the connection of adjacent first sensing cells 12a, it is advantageous in view of visibility.

The touch screen panel according to this embodiment may be usefully applied to a structure in which a touch screen panel and a display panel are integrated with each other by forming touch patterns, such as the sensing cells 12 and connection patterns 13, directly on the display panel.

More specifically, the transparent substrate 10 of the touch screen panel is implemented as an upper substrate of the display panel, and the sensing cells 12 and the connection patterns 13 are formed on one surface of the upper substrate of the display panel, thereby providing a display panel with an integrated touch screen panel. In this case, the thickness of the first insulating layer 30 between the first and second connection patterns 13a and 13b, respectively, may be limited.

For example, in a case where the display panel is implemented as an organic light emitting display panel or the like, upper and lower substrates of which are sealed by a frit, the first insulating layer 30 may be formed as a thick organic insulating layer. In this case, the organic insulating layer may be broken by a high frit firing temperature and, therefore, the organic insulating layer may be replaced by an inorganic insulating layer.

That is, in a case where the transparent substrate 10, as a base material of the touch screen panel, is implemented as the upper substrate of the display panel so that the touch screen panel and the display panel are integrated with each other, the first insulating layer 30 may be designed as an inorganic insulating layer entirely formed in the touch active area 102 in which the first and second sensing cells 12a and 12b, respectively, and the first and second connection patterns 13a and 13b, respectively, are formed. In this case, the thickness of the inorganic insulating layer is limited due to layer stress, as compared with the organic insulating layer.

Therefore, since the thickness of the first insulating layer 30 implemented as an inorganic insulating layer is limited, the first insulating layer 30 may be weak relative to static electricity. However, if the sub-bridge pattern 13a2 is formed at each of the first connection patterns 13a as described in this embodiment, the weakness relative to static electricity is improved. Thus, the touch screen panel according to this embodiment can be usefully applied to a structure in which the touch screen panel and the display panel are integrated with each other.

While the present invention has been described in connection with certain exemplary embodiments, it is to be understood that the invention is not limited to the disclosed embodiments but, on the contrary, is intended to cover various modifications and equivalent arrangements included within the spirit and scope of the appended claims, and equivalents thereof.

What is claimed is:

1. A touch screen panel, comprising:
   a transparent substrate;
   a plurality of first sensing cells formed to be connected along a first direction on the transparent substrate;
   a plurality of second sensing cells disposed between the first sensing cells, and formed to be connected along a second direction on the transparent substrate;
   a plurality of first connection patterns which connect the first sensing cells to one another along the first direction;
   a plurality of second connection patterns which connect the second sensing cells to one another along the second direction; and
   a first insulating layer interposed between the first connection patterns and the second connection patterns;
   each of the first connection patterns comprising a main bridge pattern separately patterned in a different layer from the first sensing cells, the main bridge pattern connecting adjacent first sensing cells to each other along the first direction, and a detour path formed along a portion of the main bridge pattern by at least one sub-bridge pattern branching from the portion of the main bridge pattern and having both ends connected to the main bridge pattern, the ends of the sub-bridge pattern being spaced apart by a portion of the sub-bridge pattern and the portion of the sub-bridge pattern being spaced-apart from the main bridge pattern.

2. The touch screen panel according to claim 1, said at least one sub-bridge pattern being extended from a starting point which branches from one point of the main bridge pattern and being then bent at a predetermined angle at least one time so that an ending point of the sub-bridge pattern is connected to another point of the main bridge pattern.

3. The touch screen panel according to claim 2, a triangular shape being made by combining said at least one sub-bridge pattern and the main bridge pattern between the starting point and the ending point of said at least one sub-bridge pattern.

4. The touch screen panel according to claim 1, further comprising outer lines which connect the first and second sensing cells, which are connected along the first and second directions for each line, to an external driving circuit;
the first connection patterns being formed of a same material in a same layer as the outer lines.

5. The touch screen panel according to claim 4, the first connection patterns and the outer lines being formed of a metallic material.

6. The touch screen panel according to claim 1, the first sensing cells, the second sensing cells and the second connection patterns being formed of a transparent electrode material.

7. The touch screen panel according to claim 6, the second sensing cells and the second connection patterns being integrally patterned for each line along the second direction.

8. The touch screen panel according to claim 1, the first sensing cells having patterns separated from each other between the second sensing cells.

9. The touch screen panel according to claim 8, end portions of each of the first connection patterns being connected to adjacent first sensing cells through contact holes.

10. The touch screen panel according to claim 9, the contact holes being formed when one first connection pattern is connected to one first sensing cell.

11. The touch screen panel according to claim 1, the first connection patterns being formed of an opaque metallic material, and the second connection patterns being formed of a transparent electrode material together with the first and second sensing cells.

12. The touch screen panel according to claim 11, a width of the first connection patterns being narrower than a width of the second connection patterns.

13. The touch screen panel according to claim 11, one first connection pattern being formed when adjacent first sensing cells are connected to each other.

14. The touch screen panel according to claim 1, the transparent substrate comprising an upper substrate of a display panel so that the touch screen panel and the display panel are integrated with each other.

15. The touch screen panel according to claim 1, the first insulating layer comprising an inorganic insulating layer entirely formed in a touch active area in which the first and second sensing cells and the first and second connection patterns are formed.

16. The touch screen panel according to claim 1, said at least one sub-bridge pattern being disposed to overlap with the second connection pattern adjacent thereto, and to protrude from the main bridge pattern on a same plane.

17. The touch screen panel according to claim 1, said at least one sub-bridge pattern comprising a plurality of sub-bridge patterns which are formed at each of the first connection patterns.

18. The touch screen panel according to claim 1, the main bridge pattern being designed to be inclined at a predetermined angle with respect to one of a horizontal direction and a vertical direction determined as the first direction.

19. A touch screen panel, comprising:
a transparent substrate;
a plurality of first sensing cells formed to be connected along a first direction on the transparent substrate;
a plurality of second sensing cells disposed between the first sensing cells, and formed to be connected along a second direction on the transparent substrate;
a plurality of first connection patterns which connect the first sensing cells to one another along the first direction;
a plurality of second connection patterns which connect the second sensing cells to one another along the second direction; and
a first insulating layer interposed between the first connection patterns and the second connection patterns;
each of the first connection patterns comprising a main bridge pattern separately patterned in a different layer from the first sensing cells, the main bridge pattern connecting adjacent first sensing cells to each other along the first direction, and a detour path formed along a portion of the main bridge pattern by at least one sub-bridge pattern branching from the portion of the main bridge pattern and having both ends connected to the main bridge pattern, the ends of the sub-bridge pattern being spaced apart by a portion of the sub-bridge pattern and the portion of the sub-bridge pattern being spaced-apart from the main bridge pattern,
the sub-bridge pattern integrally formed with the main bridge pattern, and the width of the sub-bridge pattern being narrower than the main bridge pattern.

20. A touch screen panel of claim 19, the width of the sub-bridge pattern being constant.

* * * * *